(12) United States Patent
Yost et al.

(10) Patent No.: US 10,960,444 B2
(45) Date of Patent: Mar. 30, 2021

(54) CLOSURE METHODS FOR MINES

(71) Applicants: Karl William Yost, Anacortes, WA (US); William Simon, Durango, CO (US); Richard Wayne Alexander, Lebanon, OR (US)

(72) Inventors: Karl William Yost, Anacortes, WA (US); William Simon, Durango, CO (US); Richard Wayne Alexander, Lebanon, OR (US)

(*) Notice: Subject to any disclaimer, the term of this patent is extended or adjusted under 35 U.S.C. 154(b) by 0 days.

(21) Appl. No.: 16/378,507

(22) Filed: Apr. 8, 2019

(65) Prior Publication Data

US 2019/0308229 A1    Oct. 10, 2019

Related U.S. Application Data

(60) Provisional application No. 62/654,206, filed on Apr. 6, 2018.

(51) Int. Cl.
| | | |
|---|---|---|
| *B09B 3/00* | (2006.01) | |
| *E21F 15/00* | (2006.01) | |
| *B09B 1/00* | (2006.01) | |

(52) U.S. Cl.
CPC ............ *B09B 3/0016* (2013.01); *B09B 1/008* (2013.01); *E21F 15/005* (2013.01)

(58) Field of Classification Search
CPC ....... E21C 41/32; B09B 1/008; B09B 3/0016; E21F 15/005
See application file for complete search history.

(56) References Cited

U.S. PATENT DOCUMENTS

| | | | |
|---|---|---|---|
| 3,440,824 A | | 4/1969 | Doolin |
| 4,149,968 A | * | 4/1979 | Kupiec ................. C02F 11/008 |
| | | | 210/665 |
| 4,163,582 A | | 8/1979 | Voss |
| 4,576,513 A | | 3/1986 | Lindoerfer et al. |
| 4,906,135 A | | 3/1990 | Brassow et al. |
| 5,037,479 A | * | 8/1991 | Stanforth ................. A62D 3/33 |
| | | | 405/129.25 |

(Continued)

FOREIGN PATENT DOCUMENTS

DE          3817549 A1    12/1989

OTHER PUBLICATIONS

"Disposal of Hazardous Waste in Underground Mines," edited by V. Popov and R. Push, the Sustainable World, vol. 11 WIT Press, 2006 ISBN 1-85312-750-7, 284 pages.

(Continued)

*Primary Examiner* — Carib A Oquendo
(74) *Attorney, Agent, or Firm* — Perkins Coie LLP

(57) ABSTRACT

Treatment technology directed to using mine waste as a raw material to manufacture a mine filling product for use as a suitable precursor product or mine filling product to be used as a backfill material to close a mine. The precursor product or mine filling product retains its metals and is not be able to generate acidity. According to the disclosure, the precursor product or mine filling product, when placed in a mine, may also remove metals from mine fluids in the mine it contacts, and still retain the metals it hosted when it was a mine waste prior to it being used as a raw material to manufacture the precursor stowing backfill product.

17 Claims, 6 Drawing Sheets

(56) References Cited

U.S. PATENT DOCUMENTS

| | | | | |
|---|---|---|---|---|
| 5,141,365 | A | * | 8/1992 | Smart .................... C04B 28/04 405/129.3 |
| 5,340,235 | A | | 8/1994 | Milliken |
| 6,033,467 | A | * | 3/2000 | Krofchak ................. C04B 7/21 106/714 |
| 6,322,293 | B1 | * | 11/2001 | Stephens ................ C04B 28/02 299/11 |
| 7,056,062 | B2 | | 6/2006 | Takeuchi et al. |
| 7,097,386 | B2 | | 8/2006 | Maduell et al. |
| 9,540,929 | B2 | | 1/2017 | Aulisio et al. |
| 10,052,668 | B1 | * | 8/2018 | Jiang ..................... B09B 3/0041 |
| 2009/0209800 | A1 | * | 8/2009 | Forrester ................. A62D 3/33 588/256 |
| 2012/0000654 | A1 | * | 1/2012 | Justice ................... C04B 28/02 166/285 |
| 2012/0199520 | A1 | * | 8/2012 | Golovanevskiy ..... B03C 1/0332 209/214 |
| 2014/0116521 | A1 | | 5/2014 | Leneve et al. |
| 2014/0237936 | A1 | * | 8/2014 | Gryba ................... E02D 29/055 52/741.11 |
| 2015/0239782 | A1 | * | 8/2015 | Purcell, Jr. .............. C04B 28/02 166/305.1 |
| 2016/0067744 | A1 | * | 3/2016 | Snyder ..................... B07B 4/08 209/19 |
| 2016/0326872 | A1 | * | 11/2016 | Zhao ..................... E21C 41/16 |
| 2017/0044898 | A1 | * | 2/2017 | Hassani ................ E21F 15/005 |

OTHER PUBLICATIONS

Interstate Technology Regulatory Council (ITRC), "Mine Waste Issues in the United State: A White Paper," Jan. 2008, 64 pages.

Paulu, et al., "Sulfide Mining Overview," for Friends of the Boundary Waters Wilderness, accessed Apr. 9, 2019 from https://www.sosbluewaters.org/sulfide_mining_overview.pdf, 17 pages.

* cited by examiner

CLOSURE METHODS FOR MINES

CROSS-REFERENCE TO RELATED APPLICATION(S)

This application claims priority under 35 U.S.C. § 119(e) to U.S. Provisional Patent Application No. 62/654,206, filed Apr. 6, 2018, the entirety of which is hereby incorporated by reference.

TECHNICAL FIELD

The following disclosure relates generally to methods for treating mine waste and using the treated mine waste in the closure of mines.

BACKGROUND

Mine waste and mining-related residuals (collectively referred to herein as "mine wastes" or "wastes") are significant sources of heavy metals and acidity that impact the environment and human health when left in uncontrolled or inadequately protected states. As a result of weathering, erosion, acidification, dissolution of contained metals, mineralization and other forces and conditions, mine wastes can release hazardous metal substances and acidity from their masses. These pollutants can be further carried by, e.g., snow-melt, precipitation run-off, percolation, and flowing waters to impact watersheds and downgradient waterways used for potable consumption, irrigation, livestock watering, recreation, and other uses, causing or potentially causing harm to human health and the environment. While hazardous substance release from mine waste can be intermittent due to seasonal weather patterns and precipitation events, the substantial volumes of these materials and their susceptibility to produce contaminants is significant, unless they've been deposited directly in water courses and channels that continuously affect the release of the contaminants.

Abandoned, legacy, and active mines can also contribute to the release of hazardous metal substances and acidity that impact human health and the environment, particularly when drainage from the mine carries acidity and heavy metals to downgradient waterways. Unlike mine waste, mines that are abandoned, dormant, or operating are legacies that can generate acid mine drainage that flows continually from mine tunnels, crevices, and passageways, which contribute to downgradient loading of hazardous substances.

Mine waste and draining mines have been handled as separate and distinct sources of pollution, partly because of regulations, but also because of their different natures, respective difficulties and cost to remediate or restore, and the fluctuating values of commodity metals that drive or curtail continuous mineral extraction from their source mines. As such, mines have been left open for future use, but also because of mining and metal commodity economics, ownership, mine exhaustion, and regulatory and legal liability issues. Mine waste, because of its low to worthless value, the magnitude of its volumes, and also regulatory issues, has been historically left in piles, tailing ponds, embankments and the like over large surface areas typically in the same general vicinity as the mine from which they were sourced or the facility in which mined material was processed.

The extraction of metal-bearing ores from the earth and their processing has been a national strategic interest for hundreds of years. Minerals, including coal and those that contain metals such as gold, silver, copper, zinc, lead, and many others of economic importance and national strategic interest have been removed from ore bodies, lodes, veins, seams, or other deposits accessed by strip mining, pits, quarries and underground workings for energy, and/or refinement and manufacture into products important to our daily lives since the global dawning of the age of metallurgy. In particular subsurface and underground mineral accessing mining approaches often encounter groundwater or receive water intruding through the mineral formation and into opened areas such as voids and mined caverns where access was created, and the mineral deposit formerly resided.

Mining has and continues to provide resources that facilitate the growth of our country and betterment of society. Unfortunately, extensive mining efforts and massive mine operations, often in remote or sparely populated areas, have also caused adverse impacts to human health and the environment as result of inadequacies related to restoration of mining lands, the management of resultant wastes and/or residuals, and ongoing chemical reactions related to these mining-related materials and their mining-disturbed sources via their subsequent exposure to naturally occurring water, air, and bacteria.

SUMMARY

With respect to mining, metal-bearing sulfide class ores such as: argentite, chalcopyrite: galena; pyrite; pyrrhotites; sphalerite and many others that are more or less prevalent are either sought and extracted for their metal values of gold, silver, copper, lead, zinc, nickel, etc. or are undesirably encountered (as is the case for iron sulfides) in a particular formation being exploited along with the desired mineral or minerals. When such ore materials as sulfides are exposed through their extraction and processing to water, air (oxygen), and bacteria, acid mine/acid rock drainage (AMD/ARD) is created when sulfide is oxidized to its sulfate form as sulfuric acid with a low pH and high acidity content. As part of this natural degradation process, metals associated with the sulfide ore are released in dissolved and/or colloidal from and carried by the now acidic water. Other sulfidemineral containing materials, unmined ore, or mine waste and mining-related residuals are similarly reactive as they are contacted by acidic water that seeps, flows or drains to perpetuate the release of metals and formation of acidity. Thus, release and migration of metals and acidity in the drainage is enhanced in near perfect precept and phenomenon of nature with these mineral types in both mine waste and mines.

As ore mineral formations are opened and accessed, and mineral ores of value are extracted, and processed; air, water, and bacteria contact with exposed sulfide minerals is greatly enhanced because of the increased surface areas that are created and provide significantly more chemically reactive sites. Mining processes including drill and shoot/blasting, mucking/hauling/handling, crushing/sizing/milling, and separation of gangue and other low-value materials to create high value ore concentrates all create more opportunity for sulfides to react that accelerates their conversion to acidic fluids that release, contain, and carry both acidity and solubilized heavy metals.

Often, low-grade/low value mineral deposits that are wasted or set aside, waste mine rock, overburden, or other mining-related processed or unprocessed materials may not exhibit acidity or low pH. However, these materials may still contain unreacted sulfide-residuals that have not been exposed to water and/or oxygen. As such, hosted acidgenerating properties of these materials, that with exposure to moisture and oxygen, can also create AMD/ARD that will release and carry metals from their source. Examples of these materials include mine waste piles that are partially protected from exposures, or found in arid, dry climates, or those that remain submerged, or in anaerobic settings, and that when disturbed or exposed to anticipated severe global weather pattern climate changes, will create and release migratory hazardous substances.

In the United States, the Mining Act of 1872 provided the legal foundation to promote prospecting and mining for minerals and metals of economic (and strategic) importance on federal lands. In 1976, the Resource Conservation and Recovery Act (RCRA) was enacted. This act focuses on the management of all solid and hazardous wastes as defined in the act. Under its hazardous waste provisions, hazardous constituent presence and/or their characteristics within wastes defined various management options allowed under the law with respect to potential harm they caused. In 1977 Congress enacted the Surface Mining and Reclamation Control Act (SMCRA) to primarily regulate coal mining operations and to address environmental impacts of open pit coal mines and strip mining by requiring restoration of abandoned mines. In 1980, The federal government also enacted the Comprehensive Environmental Response, Compensation, and Liability Act (CERCLA or "Superfund") in 1980. This legislation established what is commonly called "Superfund" and provisions to direct and cleanup sources and impacted sites related to the presence hazardous substances and pollutants. Under the Act, the federal government can legally enforce responsible parties to clean up or cause the cleanup of contaminated sites containing hazardous substances that adversely impact human health and the environment. The Superfund legislation, subsequent amendments, and other regulations define and identify various hazardous substance pollutants including heavy metals and pH parameters common to mine wastes, residuals, and mining-related operations. Also, in 1980, RCRA was amended by the US Congress to accommodate the impracticality and cost burden the act put on mining operations related to expansive volumes of mining wastes and mine-related residuals generated by mining and ore-processing processes. Known as the Bevill Amendment, it created an exemption applicable to large volumes and masses of certain mine wastes from required management under hazardous waste regulations of RCRA. While large quantities of mine waste were exempted and remain exempt under the law from management of these materials as a waste, the law does not prevent the laws of nature from causing the release of hazardous substances that cause harm to human health and the environment where hazardous substances adversely impact water quality at both acute and chronic levels.

While these major pieces of federal legislation (and those of individual state governments) attempt to fully govern mining and its impacts, regulations and exemptions, legal interpretations, historic culturally engrained practices, and economic factors have contributed the presence of tens of thousands of abandoned, legacy, and/or dormant mines that continuously generate AMD containing hazardous metal substances that flow to creeks, streams, and rivers of a watershed, and further down gradient water supplies. While AMD from such mines continue to cause harm to the environment, so too does ARD sourced from millions upon millions of tons of mine wastes such as tailings (wet and dry), pastes, waste rock piles, partially processed ore, chat, gangue, and other slurried and solid materials that are common to mine sites and their local mining-related ore processing facilities. These also contribute to the downgradient loading of acidity and heavy metals.

With respect to and in summary of the regulations that affect contamination from mines and mine waste, CERCLA defines hazardous substances that are toxic and cause adverse conditions impactful to human health and the environment. These substances include heavy metals. The regulation does not stipulate or otherwise specify how these substances are to be managed or controlled. RCRA, on the other hand, does stipulate and specify what a waste is and what type it is to be classified. If a mining-related material is a not a waste as defined under RCRA, and then the Bevill Amendment exemption is lost because of beneficiation processing, large quantities of waste material generated by that beneficiation would then become a waste. As such, the waste generated by that beneficiation process must not exhibit characteristics of toxicity that is defined for eight (8) specific heavy metals including: arsenic, barium, cadmium, chromium, lead, mercury, selenium, and silver, or it would become a RCRA hazardous waste. Therefore, the beneficiation process cannot generate any waste or it will fall under RCRA. Other metals common to the mining industry such as aluminum, copper, manganese, nickel, and zinc are not regulated under the federal RCRA laws, but they remain hazardous substances under CERCLA and also require mitigation to prevent water contamination and pollution should they leach.

Because of the regulations that apply to all mine-related material and RCRA waste, there needs to be a method to generate an economically valuable product material that does not generate waste material as a result of the beneficiation. The present invention utilizes mine-related materials and those that are RCRA waste (collectively "mine waste") to manufacture a new product that is of economic and environmental value to seal and close abandoned legacy mines, and certain workings of active mines. By using all of the mine waste at a given location as a raw material to produce a new "mine filling product," the mine waste location will be remediated and will no longer contribute to contamination or pollution of downgradient receiving waters. Using the manufactured mine filling product as a material to backfill and stow in a mine, the mine as a source of contamination and pollution can also be mitigated, and the mine or portions of its workings may be closed.

While CERCLA and RCRA have historically been the driving regulatory forces for clean-up of contaminated sites across the US, they have not caused many cleanups of mining areas that remain abandoned as legacy features across large swaths of land, both that privately owned, as well as that managed by federal and state land management agencies, primarily due to the magnitude of the problem and cost.

Further, much of the material is exempt from solid waste regulation under Bevill, and the hopes of such material becoming of strategic importance or economic value has focused cleanup efforts and private and public funds to only those sites of extreme or severe impact. While mine wastes have been primarily left without mitigation, actively discharging mines also continue to contribute hazardous substances to the environment. Typically, only the worst contributors to down gradient pollution of water and waterways have been addressed, and those using lime and lime-based treatment systems. Many of these systems have plans to be operational for tens if not a hundred years as no effective solution to the active drainage has been developed.

As part of the regulatory system, specific tests have been devised and implemented under the regulations have not been fully expanded to address the issue of hazardous substances released from mine sites, and the management of these mine wastes and materials defined and disclosed by the present invention. The test methods apply synthetic fluids to evaluate the leachability of metals and other constituents from solid matter as described in greater detail herein.

USEPA's SW-846 Test Methods for Evaluating Solid Waste: Physical Chemical Methods specifies procedures and methods for sampling and analyzing waste and other solids materials, including those for evaluating leachable constituents from the host matrix for determination as to the classification of whether a solids waste is hazardous or non-hazardous under the toxicity rule for hazardous waste as defined in RCRA. Other methods are also included for determining the leachability of constituents from the solid material or waste. These extraction methods include: Method 1311 (TCLP—Toxicity Characteristic Leaching Procedure); Method 1312 (SPLP—Synthetic Precipitation Leaching Procedures); and Method 1320 (MEP—Multiple Extraction Procedure). While all methods can be modified to some degree, they cannot be if resultant data is to be used to classify a solid waste as hazardous or not, or if the solids waste is to be managed where it can be exposed to acid rain or acidic fluids of improperly constructed or managed landfills.

In brief summary of the conventional EPA test methods for evaluating the leachability of various hazardous substances in solids and solid waste:

The TCLP Method 1311 is used to distinguish between hazardous and non-hazardous waste. Should any metal in TCLP extract exceed the corresponding concentration limit for toxicity as defined under RCRA, the waste is classified as hazardous. If the material is hazardous and treated to render it a non-hazardous waste, the parameter concentration must be less than the limit established by USEPA under its Landfill Disposal Restrictions regulations. The TCLP extraction method utilizes a fluid made from laboratory reagent grade acetic acid, sodium hydroxide, and deionized water to achieve a pH of approximately 4.93 S.U. in one form of the fluid, and 2.88 S.U. in another form without the use of sodium hydroxide. Solid sample matrix is then sized to particles of less than approximately 3/8", and prescribed volume of the appropriate fluid, based on buffering capacity of the solid, is added to a prescribed mass of the solid. The solid and extraction fluid is then tumbled for specified time, decanted, and the supernate is filtered and analyzed for the metals it contains. This test method utilizes a fluid that is intended to replicate the fluids found in landfill leachate where organic matter degrades to organic acids that include acetic acid. While required for determining whether as solid waste is hazardous or not for its internment in a landfill, it neither adequately test material that would be placed in a mine, nor does it evaluate whether the solid material will remove heavy metals from the AMD found within a mine. Further, the TCLP method consists of only one extraction cycle that does not allow for determination of long-term stability through repeated exposure to abrasive conditions, or the acidity found in a mine.

The EPA's SW-846 Method's 1312 (SPLP) and Method 1320 (MEP) use ratios of sulfuric and nitric acid to replicate acid rain characteristic to either the eastern or western US. As with the TCLP method, these also utilize laboratory grade reagents that due not replicate the constituents, such has heavy metals and acidity, found in AMD.

With these methods, as published in EPA SW-846, the extract fluids are prepared from solutions of sulfuric and nitric acids. While these acids are constituents of acid rain, sulfuric acid is very common to acid mine and acid rock drainage. SPLP-approved fluids are chosen from one of two fluids that attempt to replicate the ratio of sulfuric and nitric acids in acid rain common to the eastern and western United States. Test Method 1320 provides for ten (10) sequential extractions of the same sample aliquot using fresh SPLP fluid appropriate for the region of the country where a particular site and waste material is located. While both test methods can be modified in the nature of the extraction fluid used, the SPLP test consists of only one extraction for acid rain exposure which does not reflect long term exposure to abrasion or acidity sourced from mines. Unlike the SPLP method, the MEP does accommodate long term exposure to abrasive conditions and acidity. However, both methods relate to the exposure of material to acid rain but can be modified to accommodate the rigors and harshness of fluids found within mines.

Only the MEP test, however, with modification to use AMD or acidic mine water as the extraction fluid will allow for exposure of a solid material sample aliquot to repeated and long-term exposure of abrasive conditions and acidity of mine fluids, even when fresh extraction fluid is required for the continued extraction of the same sample aliquot. It is noted however, that results of the MEP test are used to look at release of heavy metals over the sequence of ten (10) or more extractions, and that additional extractions may be required if constituents in extracted fluids show increasing concentrations in the later extracted sample. The method does not look at the levels of constituents present in the extract fluid prior to its use to extract the solid sample mass. As such, the method is limited in that results do not evaluate the effects of the solid mass being tested against the extraction fluid characteristics throughout the test method.

USEPA has recently developed another leaching test protocol system under SW-846. These series of test methods (Methods 1313-1316) are called the Leaching Environmental Assessment Framework (LEAF) and provide a means to evaluate sample material and provide additional information to make environmental-based decisions for the management of the tested material. Without delving into the specifics of each test method, they collectively apply laboratory grade reagents consisting of water, calcium chloride, nitric acid, and/or potassium hydroxide in various combinations and concentrations to yield solutions of various pH ranges. Solid samples, depending on their physical state and pH buffering capacities are then batch-extracted in parallel using a variety of the fluids across a range of pH in each extraction. Sample extracts are then analyzed for total metals. Unfortunately, and as with the aforementioned test methods, the extraction fluids of this method are made from pure laboratory quality reagents, and because a specific sample aliquot is not sequentially extracted with fresh fluid or actual AMD, the test method results cannot reflect long-term exposure to abrasive conditions, the pH and metal content of fluids in mines, or the acid generating properties and metal content of mine waste that can be released over prolonged exposure.

In summary of the methods accommodated by regulation and used by environmental professionals, these fluids attempt to replicate landfill leachate and/or acid rain in a simple short-term exposure test. While one test method does attempt to evaluate long-term exposure to robust abrasion and acidity, it also utilizes sequential exposure of a solid material to synthetic acidic fluid that is not acid mine drainage. In another set of test methods, solid matter is exposed in parallel to different synthetic fluids of a controlled pH to model release of hosted constituents. Other approved and long accepted methods used by engineering and geotechnical professionals to evaluate physical strength and stability characteristics, are appropriate for evaluation of certain conditions that may be applicable to the material, but they do not accommodate chemical considerations related to the degradation of material due to prolonged exposure to robust erosion and acidity and the release of hazardous substances from the solid material. Further, no test methods consider the removal of hazardous substances from the fluid that will contact the solids material in its final placement and storage location. Modification of Method 1320 to use actual acidic fluid from a mine as the extraction fluid for testing of both treated and untreated material does resolve these issues, but that fluid must be well characterized for acidity and heavy metal content prior to its application to a solid material as an extract fluid.

Geotechnical and leaching test methods are both important factors for the management of any material where it may be placed, but first and foremost for the presently described innovation is the ability of any material to retains its hazardous substances and treat hosted sulfide-minerals so as to not generate acid, and also to remove heavy metals from any fluid it contacts where such heavy metals are also present and will be in contact with the solid material Environmental regulatory agencies, environmental professionals, mining entities and mining professionals have typically addressed pollutants derived from mine wastes and mines separately.

Mine wastes are typically removed and put into repositories engineered and constructed on site. These often include massive earthworks such as excavation, moving, hauling, importing or manufacture of clean earthen material and aggregate products and their placement to build an appropriate containment facility. Geosynthetic materials are also included in these facilities as may be plastic membrane materials common to those used in conventional landfill construction. These facilities often require large surface areas that are problematic and difficult to locate due to steep remote areas in mountainous settings that also further disturb and cause harm to often the environment during construction. Further, these repositories require long-term maintenance and corrective action to repair breaches and damages caused by a variety of events such as erosion, forest fires, severe precipitation events, mud and rock slides, avalanches, floods, wind, freeze-thaw and wet-dry cycling, seismic activity, as well as vegetative root mass and burrowing animal penetrations.

Legacy and abandoned mines, and those that discharge mine fluids containing heavy metals and acidity are typically addressed by treatment of the drainage using lime-based treatment systems. Some mines have been modified to include plugs or seals, or bulkheads to minimize the release of water and the contaminants it can carry.

Another approach to mines and AMD is the installation of bulkhead and plugs within the mine. These will prevent or at least minimize AMD release from actively draining mines, but water levels within mines will rise and create water pressures from standing water within mine works, stopes and shafts, and connective passages between mines that can also cause seeps and releases from geologic rock fractures, veins, and other conveyance pathways not necessarily related to the specific mine. While elevated water levels within former mine workings may isolate unreacted sulfide materials from oxygen, most if not all of pooled and retained mine water will remain acidic and contain dissolved metals and find it release by overtopping bulkheads or other pathways. As such, these features may minimize flow and thus heavy metal loading, but they do not remove heavy metals or acidity.

Also, efforts have address air supply, thus oxygen, in to the mines that facilitates the production of AMD. In these cases, ventilation shafts and mine portals of entry have been sealed. Rarely are mines filled with backfill materials as they are continued sources of heavy metals, and because the mines are often desired to be remain accessible for future extraction. For those that are exhausted or otherwise worthless, and where mine waste is backfilled, say for closing of only a portion of the mines working, these materials will continue to leach and contribute heavy metals to the mine. Further and when mine waste is processed, it is often modified with cement, pozzolans, and/or other metallic hydroxide generating materials to lower metal leachability. Unfortunately, the acidity of the mines and their fluids will neutralize these altered materials and metals will be released. Similarly, acidity will degrade the physical strength of the mine waste over time, again causing release of heavy metals once the buffering capacity of the fill material is overcome by the mine's acids.

In other approaches where mines are used to manage mine wastes. In other underground mine waste disposal approaches, such as for radioactive materials, and to protect it from mine fluids and water, wastes are packed in tightly sealed containers approved for underground waste disposal to handle mechanical strains, meet regulatory standards, and most importantly provide long-term protection against acidic corrosivity and subsequent degradation of the waste container.

Mine wastes and AMD release from mines have been separately and distinctly addressed using technologies applicable to either one or the other problem source, the specific metals released from either. Further and specifically, no technology existed until now that will stop the formation of AMD within mines, fill the mine voids where water collects to curtail its release, and prevent the migration of hazardous metal substances from mines, but that will also address the problem with mine waste not associated with the mine. An approach and tool is needed by both mine and environmental professionals to mitigate the cause, formation, and release of hazardous substances from mines and mine waste using a collective and combined approach that is technically viable and converts legal and financial liabilities of the problem sources to assets of value by providing a long-term permanent solution to both mine wastes and mines where acidic fluids form and can drain to the environment with detrimental impacts to human health and the environment.

DETAILED DESCRIPTION

Described herein are various embodiments of a method of using treated mine waste to backfill and close off abandoned mines. In some embodiments, the method generally involves treating mine waste to reduce the hazardous nature of the mine waste, and subsequently using the treated mine waste to backfill and close off a mine. In some embodiments, backfilling the mine with treated mine waste minimizes or eliminates drainage of hazardous material from the mine. In some embodiments, the mine waste is treated in such a way that when the treated mine waste is used to backfill the mine, the treated mine waste interacts with hazardous material located inside the mine to thereby treat the hazardous material located in the mine.

According to aspects of the present method, a treatment technology to use mine waste as a raw material to manufacture a product for use as a suitable precursor product may be used as a backfill material in a mine. The precursor product retains its metals and is not be able to generate acidity. The precursor product, when placed in a mine, may also remove metals from mine fluids in the mine it contacts, and may retain the metals it hosted when it was a mine waste prior to it being used as a raw material to manufacture the precursor stowing backfill product.

Benefits of the methods described herein may include some or all of the following: treatment of mine waste to reduce or eliminate its hazardous nature; permanent storage of mine waste in a secure facility; mitigation of migration of mine drainage containing hazardous substances from a mine; and permanent closure of a mine. Based on some or all of these benefits, the methods described herein generally abate the release of hazardous substances such as heavy metals and acidity to the environment from the original mine waste and the mine.

Figure 1:
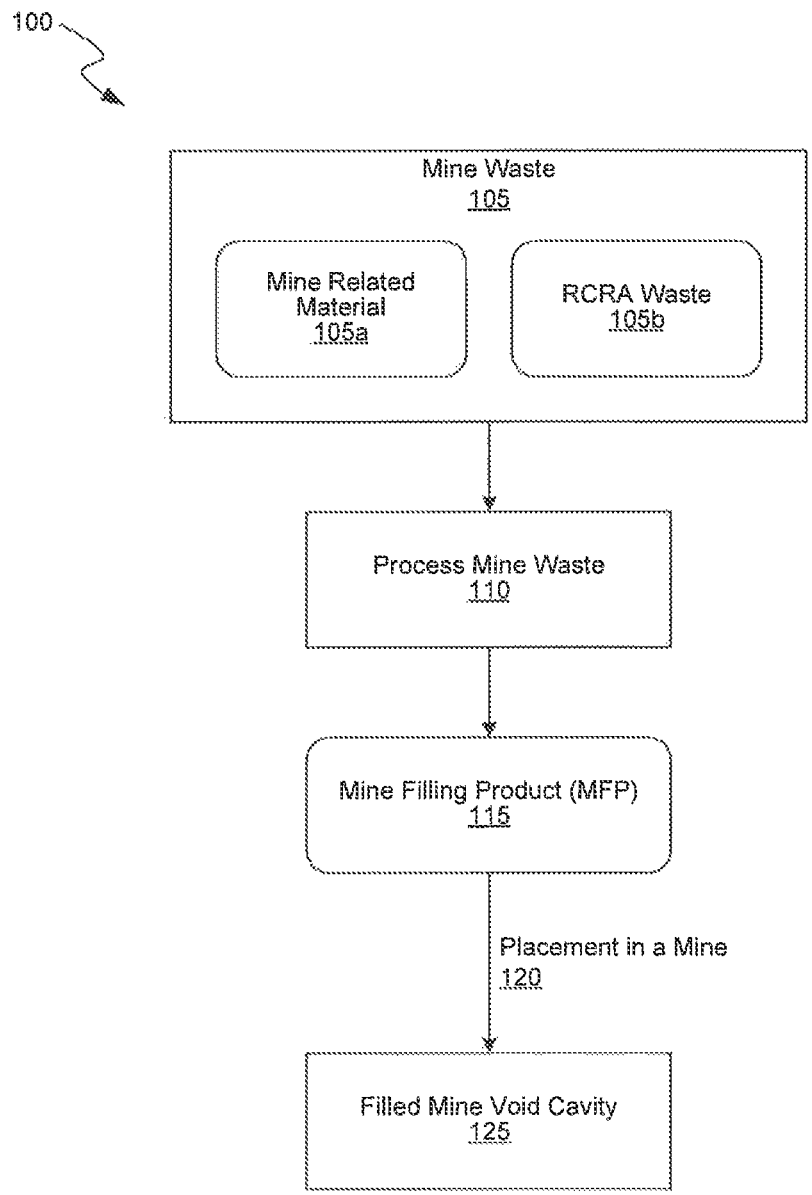
FIG. 1 is a flow chart illustrating a mine waste treatment and mine closing method in accordance with embodiments of the present technology.

FIG. 1 is a flow chart illustrating a method 100 of treating "mine waste" 105 comprised of mine-related material 105a and/or RCRA waste 105b from a mine site to manufacture a beneficial filling product of value (i.e. a precursor mine stowing backfill product) 115, and using the filling product 115 to backfill and stow 120 to produce a filled mine void cavity 125 so that the mine or part of its workings may be closed in accordance with embodiments of the present technology. The method 100 generally includes a step 110 of treating and processing mine waste 105 to treat at least one hazardous component or aspect of the mine waste, for example leachable hazardous metal substances, to create a mine filling product 115 that is suitable for use as a mine backfill stowing material, and a step 120 of backfilling a mine with the treated product 115 that was manufactured 110 from mine waste resulting in a filled or closed mine 125 in part or in entirety.

In step 110, one or more sources of mine waste are processed in order to treat one of more hazardous components or aspects of the mine waste 105 to generate a mine filling material 115. Mine waste 105 generally refers to material that is considered a waste product of a mining process even if exempted by the Bevill Amendment, and may include mining-related residual material 105a, but also material from a mining site that is also a waste as defined by RCRA, and pursuant to the Bevill Amendment 105b. The type and composition of the mine waste 105 subjected to the manufacturing process in step 110 is generally not limited.

In some embodiments, the mine waste 105 comprises a relatively high concentration of heavy metals and/or has a relatively high acidity level. Ideally, the concentration of heavy metals, on a specific metal basis, will exceed the level at which the respective metal would leach into AMD fluid at concentrations that would exceed each respective metals' limit standards of RCRA, and the federal Clean Water and/or Safe Drinking Water Acts, as well as applicable state regulated water quality standards for the geographic location of the site. Mine waste suitable for use in step 110 is generally stored in piles, tailing ponds, embankments, or the like. The piles, tailing ponds, embankments, etc., may be located in relatively close proximity to the mine from which they were produced. As such, the mine waste processed in step 110 that manufactures a mine filling material may be sourced from a location proximate the mine into which it will be backfilled in step 120. Alternatively, the mine waste processed in step 110 can be sourced from a location remote from the mine into which it will be backfilled in step 120. Multiple sources of mine waste can be combined prior to step 110 and treated together as a common stream.

The specific process used on the mine waste in step 110 is generally not limited to manufacture or produce a mine filling material product. The process used in step 110 may be any process that eliminates or minimizes any hazardous component or aspect of the mine waste. The process may also be one in which a hazardous component or aspect is chemically reacted or otherwise altered so that the hazardous substance will not leach above various water quality standards when exposed to mine fluids. In embodiments where the mine waste includes heavy metals, an objective of processing the mine waste may be to alter or otherwise impact some or all of the heavy metals. In some embodiments, the process used in step 110 is one in which heavy metal components of the mine waste are removed from the waste material or otherwise treated such that the heavy metal cannot leach out of the mine filling product when exposed to various leaching tests, including those that replicated acid rain, landfill leachate, or fluids within the mine to receive the mine filling material product. Any available technology known or that is demonstrated to be effective for this type of mine waste processing can be used. In some embodiments, the processing step 100 includes the use of any chemical treatment technology that reacts with some or all hazardous metal substances that can leach from the mine waste as a result of contact with mine fluids of the mine selected to receive the treated mine waste. Similar processes can be used to remove or treat other hazardous components of the mine waste.

In addition to or in place of processing steps aimed at sequestering and/or removing hazardous components of the mine waste, the process step 110 may further include the use of processes that alter an aspect (e.g., physical property) of the mine waste. In some embodiments, the aspect of the mine waste altered by the step 110 is changing the strength of the mine waste as well as the leachable level of metals in the produced mine filling material product. Mine waste typically has a high acidity, and in some embodiments, the process step 110 includes processing the mine waste to reduce the acidity level, but also the acid generating properties of the mine waste. However, other alterations to acidity and acid-producing properties that may be beneficial in terms of reducing the hazardous nature of the mine waste may also be used so that the mine filling material remains stable and does not leach metals when placed in a mine that may or may not have mine fluids present.

In some embodiments, the process step 110 is used to ensure that acid-generating properties of the mine waste cannot generate additional acidity, such as when combined with material in the mine during backfilling step 120. For example, the mine waste may be treated in such a way that it sulfides are destroyed or react to form stable mineral forms that need not be metallic or other hydroxides at an alkaline pH as a means for treating or otherwise dealing with heavy metal components of the mine waste, unless that treated material filling product is demonstrated to be stable for prolonged periods of exposure to AMD such as measured by the Modified Method 1320 where AMD is used as the extraction fluid, or if stable when tested by methods stipulated by the jurisdictional regulatory agency.

Figure 1A:
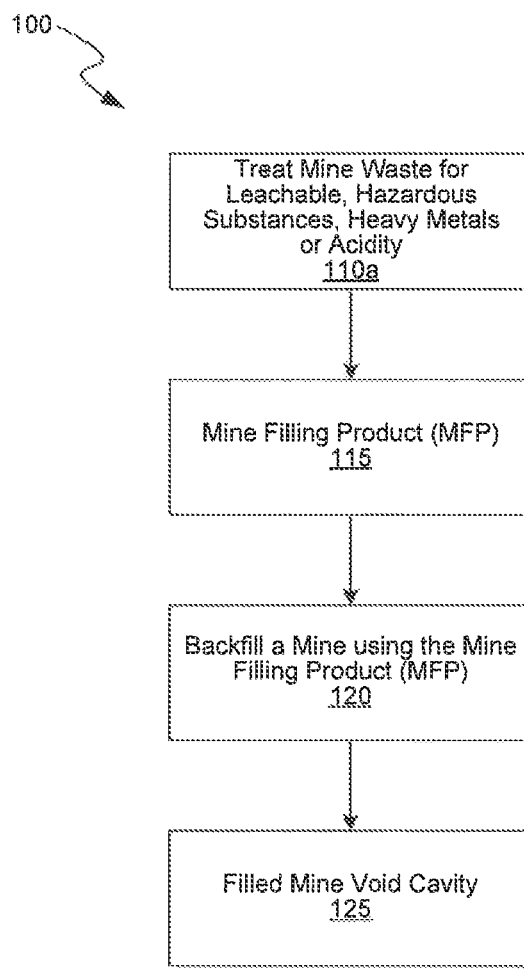
FIG. 1A is a flow chart illustrating a mine waste treatment and mine closing method in accordance with embodiments of the present technology.

With reference to FIG. 1A, processing step 110 can include one or more processing sub-steps 110a, 115. That is to say, multiple processing sub steps 110a, 115, each having their own impact on the mine waste, can be used together as part of the overall processing step 110. For example, processing step 110 may include a first processing sub-step 110a aimed at treating or removing leachable heavy metals from the mine waste, followed by a second processing sub-step 115 aimed at treating acidity and/or acid generating properties of the mine waste in the desired manner. The order of carrying out the processing sub-steps 110a, 115 is generally not limited provided that a first process sub-step 110a need not be carried out in order to successfully carry out the next processing sub step 115. Alternatively, a single step 110 may accomplish more than one objective, such as a single processing step that is capable of both treating or removing heavy metals and treating acidity and/or acid-generating properties of the mine waste and of mine waste within the mine.

Acidity is the level of acid in a material. An acid-generating property of a material, as an example, is sulfide in the form of a metallic sulfide contained within ore. Sulfides will react in the presence of water, oxygen, and certain bacteria to generate acidity in the form of sulfuric acid. pH is a scale of acidity from 0 to 14, where 0 is highly acidic with low alkalinity, 7 contains and equal amount of acidity and alkalinity, and 14 is highly alkaline with low acidity. When an ore or mining related waste material that contains heavy metal sulfide substances is exposed to air, water, and bacteria, acidity is generated in the form of sulfuric acid. In that conversion, heavy metals become leachable, and the generated acid will keep them soluble as well as solubilize metals from other material the acidic fluid subsequently contacts, that in turn, will create further acidity and release metals in that material.

As a result of step 110, the mine filling product is preferably converted to a treated mine waste that not only retains its own heavy metals, but also addresses acid generating properties of the mine waste. The treated mine waste produced by step 110 is also preferably treated so as to be capable of removing heavy metals from mine fluids which the treated mine material contacts during and after backfilling step 120.

In some embodiments, the processing step 110 uses technology to produce a mine filling material that, in addition to treating metals and acidity to meet CERCLA and other water quality objectives, generates treated waste material in the form of dry, stackable material, paste, or slurries. The production of this type of treated mine waste product generates a material suitable for use in backfilling of caverns, chambers, voids, and open areas within a mine. In some embodiments, the processing methods used in step 110 include methods that adjust water content of the mine waste to increase or decrease the manufactured filling material product's pumpability, slump, stack-ability or other properties. This, in turn, enhances the ease of placement of the mine filling product in the mine.

In some embodiments, the mine waste is processed in step 110 such that the physical strength of the product material is improved. Use of processed mined waste product having improved physical strength as leachable metal treatment capacity may be necessary for creating stops and blockages in the mine, as well as working platforms within the mine to better access voids and place the processed mine material. In still other embodiments where the mine waste treatment product is treated to improve strength and retain leachable metals, the treated mine waste can be used to prevent or otherwise minimize mine collapse that causes subsidence reflected to the ground surface where sink holes and surface grade differential settlement can cause severe damage. However, all processed mine waste will required to be processed to mitigate leachable metals if they are present to manufacture a suitable mine filling material, regardless of desires for mine filling product strength.

Figure 2:
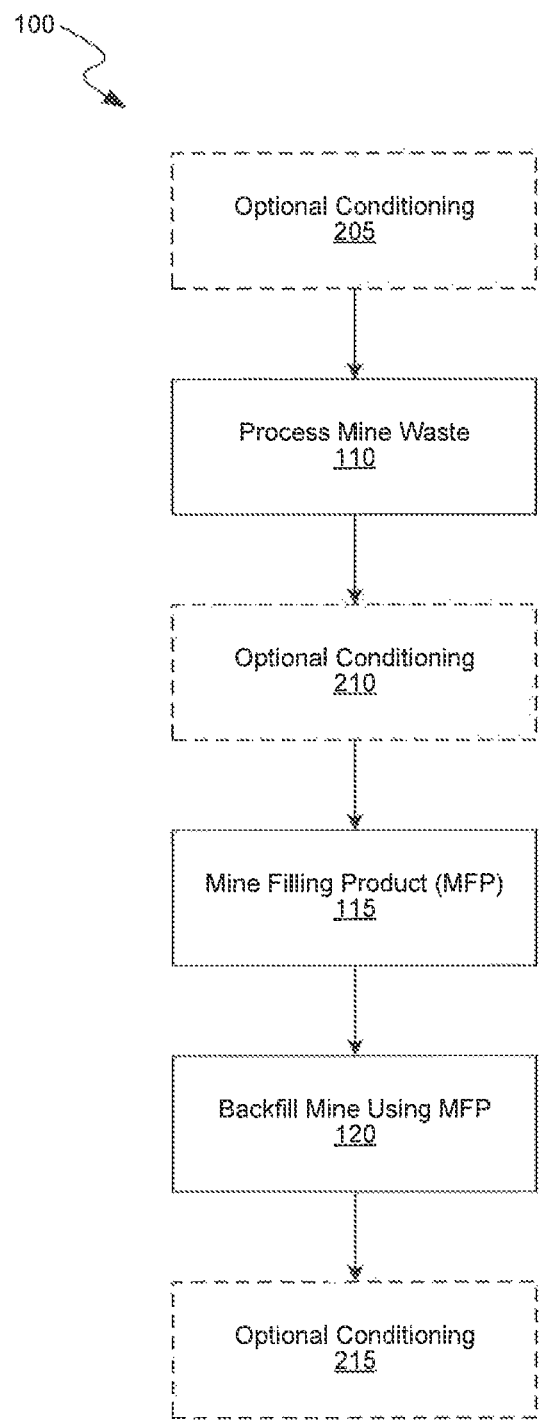
FIG. 2 is a flow chart illustrating a mine waste treatment and mine closing method in accordance with embodiments of the present technology.

With reference to FIG. 2, prior to, during, or after processing step 110, or between sub steps 110a, 115 of processing step 110, the method may include one or more conditioning steps 205, 210, 215 wherein the mine waste is conditioned for improved processing in step 110 to manufacture a suitable mine filling material 105 (not shown) and/or improved backfilling in step 120. An aim of the one or more conditioning steps 210 may be to condition the mine waste for improved treatment by the processing step 100. Any conditioning step that allows for improved processing in step 110 (e.g., treatment of leachable heavy metals, or their removal to below leachable levels) can be used. For example, conditioning may include screening, crushing, and/or washing the mine waste. According to aspects of the disclosure, conditioning does not include chemical treatment of the mine waste. Another aim of the one or more condition steps may be to improve the backfilling step 120. In some embodiments, the conditioning step 210 includes the removal of oversize material that would compromise or damage backfilling and/or stowing equipment that may be used in backfilling step 120.

Figure 2A:
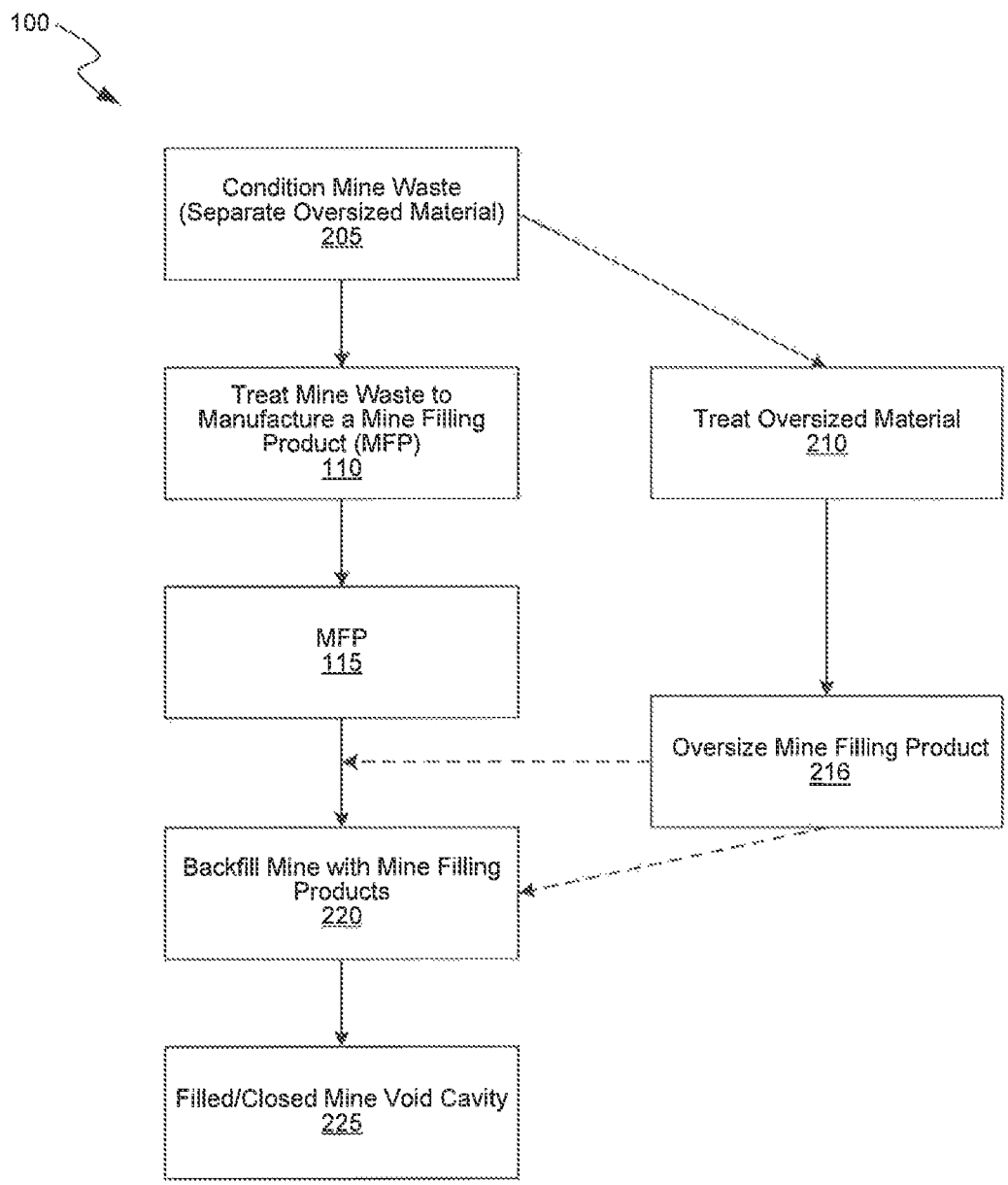
FIG. 2A is a flow chart illustrating a mine waste treatment and mine closing method in accordance with embodiments of the present technology.

With reference to FIG. 2A, the method 100 includes a conditioning step 205 wherein oversize material is removed from the mine waste prior to processing step 110. Any method of separating oversized material from the mine waste can be used, including, e.g., classification or screening. As illustrated in FIG. 2A, the separated oversized material can be subjected to treatment step 210 to manufacture an oversize mine filling product 216 so that it may be used as a separate coarse or large graded mine filling product for direct placement in a mine, or with blending with the screened fines used to manufacture the mine filling material product 110. For example, treatment step 210 can include washing or otherwise treating the oversized material to remove any surficial contamination. Once cleaned or otherwise treated to remove contamination, the oversized material can be used for other purposes, including as part of the backfilling step 220 as described in greater detail below.

Figure 2B:
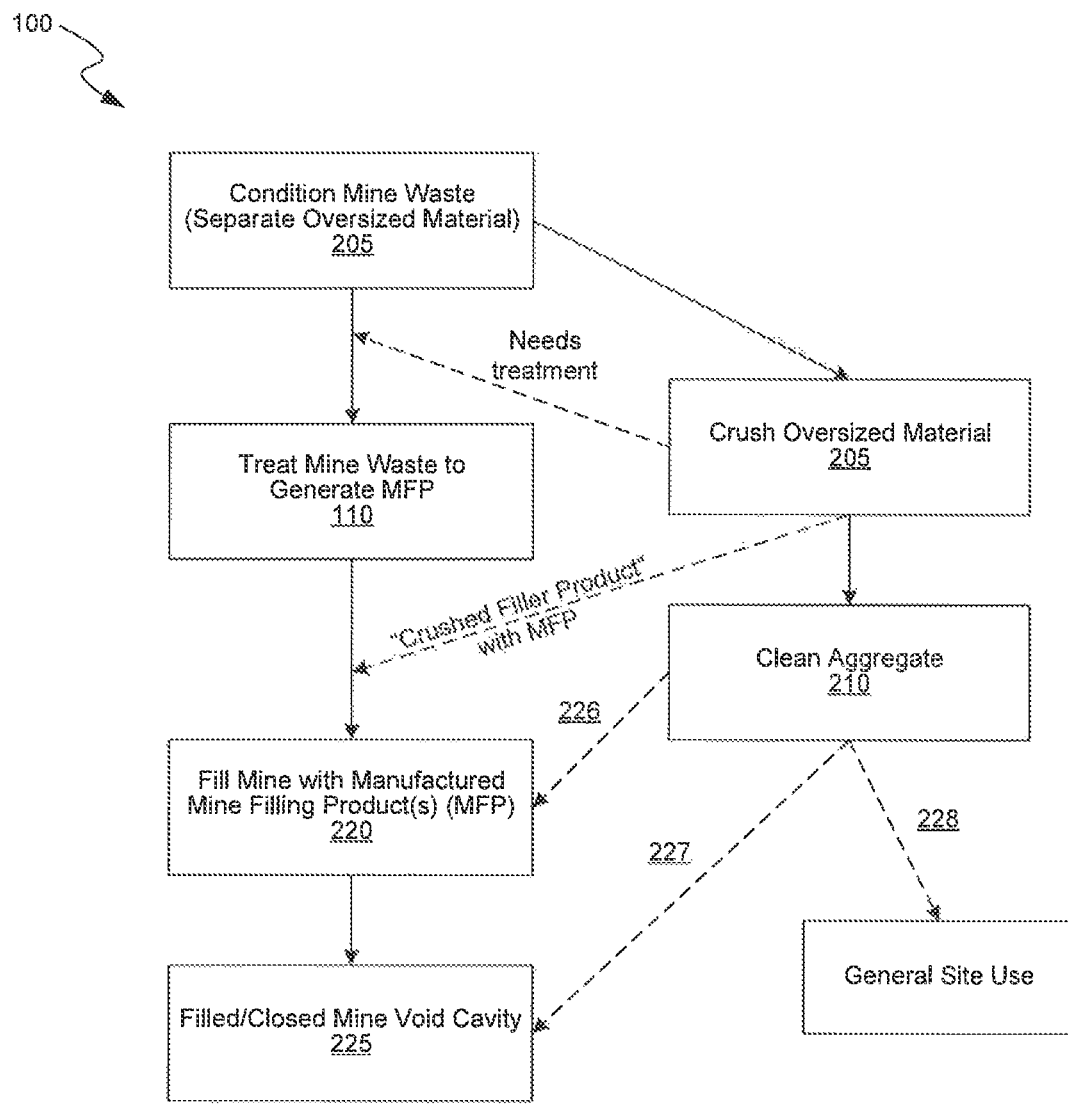
FIG. 2B is a flow chart illustrating a mine waste treatment and mine closing method in accordance with embodiments of the present technology.

With reference to FIG. 2B, condition step 205 can include crushing and/or sizing steps to reduce the size of the oversized material. Any techniques suitable for crushing and/or sizing the oversized material can be used. Once crushed, the material can be added back with the mine waste 226, either before or after step 110. Alternatively, the crushed material can be added to the mine, optional step 227, in as part of the backfilling step 220 or supplemental to step 220 (i.e., not as part of backfilling the mine, per se, but added to material already in the mine that is subsequently backfilled), or if properly processed and tested as below contaminant limits, may be used as a clean aggregate product 228 for general approved use onsite. Step 225 is filling or partially filling and closing mine void cavity. All three (3) options are illustrated in FIG. 2B. Crushed material that is contaminated or contains acid generating properties and/or heavy metals can be deposited in the mine where treated mine material is deposited or backfilled in step 220, but this may require using alternative conveyance and placement means so as not to damage or clog pumps, conveyors, and piping and other such appurtenances. As discussed previously, the treated mine material, when mixed with hazardous mine material located in the mine to be backfilled and/or material added to the mine to be backfilled (such as contaminated crushed material), can address contamination of these mine materials.

While shown separately in FIGS. 2A and 2B, an embodiment of the method is also possible where both treatment steps 110 are carried out. For example, oversized material can be separated from the initial mine waste, and then subjected to a crushing step 205, followed by an optional cleaning step 210, as shown in FIG. 2B. The reverse configuration (cleaning then crushing) is also possible.

While the above processing, conditioning and treatment steps have generally been described as steps being performed on the mine waste outside of the mine, it may also be possible to perform some or all of these steps inside of the mine to be backfilled. In such embodiments, only water leaves the mine workings, and such water can be treated prior to egress from the mine workings.

While some of the processing techniques may require the addition of materials to the mine waste as part of altering one or more hazardous components or aspects of the mine waste, it is generally not preferred to add cement and/or pozzolanic materials to the mine waste as part of a processing step due to the fact that constituents of these materials may introduce into the mine waste heavy metals and alkalinity that generates metallic hydroxides that are not stable for prolonged periods with exposure to mine fluids, and AMD in particular. Similarly, while bacteria supplementation of the mine waste is also possible, it is generally not preferred, as the organisms may be taxis to external stimuli, such as food source and oxygen levels, and therefore difficult to control and facilitate their desired in-mine living conditions suitable to sustainable propagation of the selected species and strains.

In summary, processing step 110 generally aims to manufacture, physically process, condition, and/or chemically treat mine waste to yield a processed mine filling product having beneficial re-use characteristics related to heavy metal and other constituent leachability of the mine waste and the mine AMD to meet criteria herein described.

In step 120, the processed mine waste is an embodied mine filling product used to backfill and, in some embodiments, close off a mine, or partial workings therein. The specific techniques and equipment used for the backfilling step 120 are generally not limited provided the techniques and equipment adopt the use of the mine waste processed in step 110. Those skilled in the art of material stowing in a mine will also be aware of methods, system, and approaches to control the fill with respect to stacking, diversion, dams, bulkheads and other such means to position and retain the processed mine waste during the filling operational sequences. Backfilling step 120 may be carried out using means and methods including: hydraulic or pneumatic stowing; dry material backfilling, mechanized (conveyor, ore car, conveyors, haulers, muck loaders and trucks, muck buckets, and other such means) backfilling, pneumatic backfilling, paste and paste cemented backfilling, self-slide backfilling (for shafts, and steep-inclined seams and stopes), and other of the like; injection pumping of grout, paste, foam in-fill, fluid or slurries through pipes installed within the mine shafts, tunnels, adits, and drifts, and/or via drilled bore holes penetrating from surface to a mine goaf or goaves, bulkheads, dams, barricades, etc. installations for material retention and diversion within the mine workings; and dewatering, drainage, packing, and densification of beneficial re-use material.

The mine to be backfilled in step 120, such as mine caverns and mine voids, may be accessed by existing shafts or boreholes into the void space or spaces from above their location. As with typical filling operations, many options exist for ensuring the voids of mines are properly filled and controlled during the backfilling step 120. Safe access and egress to the mine should be maintained during backfill step 120. Efforts can also be made to ensure access is maintained to far reaches of the mine so that such area can be backfilled.

Mine suitable for use in the method 100 described herein are generally not limited. In some embodiments, the mine to be backfilled in step 120 has a minimal volume of mine fluids, with static or only minimal flow. Mine fluid is also preferably of an acidic pH, although the methods described herein can also be used on mines having mine fluid of any pH. Deeper mine pools (i.e., mines having larger mine fluid volumes) may also be used to receive the processed mine waste in backfill step 120 provided mine water displaced by the deposition of processed mine waste is removed and treated for reuse or discharged as approved by appropriate regulatory agencies.

In some embodiments, the backfilling step 120 results in the mines being completely or partially sealed permanently with the processed mine waste, including filling all mine voids with the processed mine waste to prevent intrusion of water.

Because of a mine's typical subterranean location, the final closure may be protected from some or all factors that would otherwise create risk of failure to above ground repositories. For example, mine cavities and caverns are typically surrounded by rock and hard mineral materials. With properly processed mine waste that yields a suitable mine filling material for backfill stowing placement and installation in the mine, the filled mine will be well protected from any number of forces. Additionally, when properly backfilled via step 120, void spaces will be filled with processed mine waste so that water pressure from a formation surrounding the former void is equalized and water will not drain into and displace the stowed processed mine waste. As such, migratory water within the entire formation outside of mined voids will find other alternative conveyance avenues such as formation cracks, seams, fissures, and other pathways, thus avoiding the processed mine waste as a result of reduced hydraulic pressure and resistance than that of the filled void.

The mine filling product may contain mine waste particulates and fines that when placed in the mine may migrate from the filling product after placement and fill and seal fissures, pores, micro-fractures or other small conveyance, thus impeding migratory water egress and ingress to the mine. As such, in some embodiments, step 120 is carried out such that material fines within the treated mine waste will migrate into and seal the various conveyance pathways if/when carried by water, including those naturally existing or those created during mineral disruption and extraction emanating from the extraction workings hard rock or mineral surfaces. As such, a mine properly filled with the processed mine waste is a sealed system that prevents ingress and egress of mine fluids.

In some embodiments, the methods described herein may include the capture, collection, and draw-down of mine fluids and drainage prior to and/or during backfill step 120. Collected water may be used to process the mine waste in step 110, and/or be used as a carrier to facilitate processed mine waste placement in step 120. Alternatively, the water may be treated for discharge or another reuse.

As described previously, oversized material separated from the mine waste can be used in the backfill step 120. In general, this oversize material is best used where structural enhancement is needed to secure mine ports of access, vent shafts, tunnels, and other ingress/egress openings, and/or construct roads, work pads and for armoring and securing unstable surfaces. The density, hardness, and size cause oversize material to be a valuable resource suitable for use in aiding the placement of processed mine waste, and to secure the mine. The oversize material can also serve as a clean backfill or construction aggregate product. It may be blended with other additives such as asphalt or cement and placed to armor or permanently seal and secure portals, shafts, adits and the like before or after the processed mine waste is placed in the mine via step 120.

In some embodiments, the processed mine waste can be used to create an effective chemical barrier or layer within the mine to hold untreated mine wastes and prevent their exposure to mine fluids and the factors that cause the formation of AMD. When used in this manner, not all mine waste will require processing, as the installed layer will provide the protection and isolation needed to prevent contact with mine fluids and the formation of AMD.

Examples

In the 1980's RCRA regulations were promulgated that defined the differences between hazardous and non-hazardous wastes. The regulations also stipulated that each of these waste types required different means of management and disposal. Solids wastes that were classified as hazardous required more stringent management and disposal efforts, and those that were non-hazardous. Landfills for non-hazardous wastes were less costly to design, construct, and manage, while hazardous waste landfill were much more costly, harder to permit, required more operation and management efforts that included the requirement to treat the hazardous waste at the landfill prior to its internment. As such, there was, and still is, a significant disposal cost differential between hazardous and non-hazardous waste. Further, the costs for transportation of hazardous wastes from their point of origin to the landfill disposal facility are significantly more than those for non-hazardous waste. As a result of these cost differentials, there was an economic need for the development treatment technologies for generators of hazardous waste to process the material at its point of origination to render the waste non-hazardous to allow for its less costly landfill management.

Many technology developers looked at the chemistry of various wastes types and chemicals that caused waste to be hazardous. For solid waste such as soil that contained heavy metals that leached in excess of the RCRA toxicity criteria, treatment technologies largely relied on passing the TCLP extraction test where metals in waste were retained by the waste when extracted by a synthetic landfill leachate fluid as described elsewhere, herein. Many technologies utilized cements, fly ash, kiln dusts and others that generated strength to prevent metals from leaching, but also the formation of highly buffered treated waste that maintained an alkaline pH, thus metallic hydroxides, that were able to withstand the TCLP single extraction test's chemistry. These technologies were and are still prevalent, however, due to the amount of reagent required to meet the RCRA toxicity leachability limits, treated end-products were significantly more voluminous and had extensive mass increases for the untreated waste because of the reagent mass added, but also from water required to hydrate and/or cause the formation of the metallic hydroxides. There remained a need for other forms of treatment that did not cause these increases in mass and volume, and thus high cost related to material handling, transportation, and the final mass interned at the landfill.

This need was resolved by the development of other technologies that did not rely on strength or the formation of metallic hydroxides, or at least, the need to maintain a high buffering capacity at an alkaline pH. Most of these non-hydroxide or strength related technologies focused on the use of specialty reagents that formed metal compounds in the waste that have low solubility products. Many technologies were developed that utilized singular or multiple reagents containing silicates, carbonates, sulfides, phosphates, or other such constituents that form insoluble metal species with very low solubility products, and where the metal leachability remains very low, even in the low pH of the TCLP extraction method. As also stipulated by RCRA, only eight (8) metals are required to be evaluated for their toxicity levels in TCLP extract. Many of these technologies have been well proven over many years in the commercial arena with some specializing on one or two metals, and some are able to treat all of the RCRA metals. It is noted that most technologies have not been applied to non-RCRA that are typically found at mine sites or in mine wastes, such as aluminum, cobalt, copper, manganese, nickel, and zinc to name a few.

The examples presented herein present treatment data from three (3) technologies that do not rely on physical strength or the formation of metallic hydroxides to treat heavy metal leachability. As required in the present disclosed method, treated precursor product must be able to retain heavy metals over a prolonged period of exposure to acidity, as well as remove metals from the acidic fluid found within mines or mine sites. The three (3) technologies presented in the examples utilize phosphates, sulfides, sulfates, carbonates, or the like, and all generate an end-product with heavy metal precipitates or minerals that resist leaching in acidic conditions as they do not form metallic hydroxides.

The data in Tables 1, 2, and 3 present treatment results of various materials that contained leachable heavy metals at NPL Superfund Sites. Different commercially available treatment technologies for leachable heavy metals in soils or sediments were identified as having potential for use in the present innovation despite their intended use of rendering RCRA Subtitle C hazardous waste to a non-hazardous RCRA solid waste under the RCRA toxicity rule. Data as reported was all generated in accordance with USEPA SW-846 Test Methods for the Evaluating Solids Waste and with the intent of disposing material at a remediation project site in an engineered repository constructed. No other "off-the-shelf" commercially available technologies were considered for inclusion as examples, except the EPA lime solids based on the conventional use of lime and hydroxides. Other non-hydroxide forming technologies are available for implementation in the present method and their non-use in the examples does not preclude them in any manner, provided that any selected technology can treat RCRA metals present in mine waste to meet the toxicity limit for hazardous waste, but also treat the broad-spectrum hazardous metal substances found in mine wastes and AMD to respective metal leachable levels that are below various state and federal water quality standards applicable to the specific mine site.

Other technologies were identified that combined other forms of reagents with cement or hydroxides, but they neither purported to treat all heavy metals found at mine sites, nor did they show the ability to withstand the robust agitation and prolonged acidity exposure to the USEPA's Method 1320 (Multiple Extraction Procedure) for acid rain or other improperly constructed and maintained landfills. The technologies considered herein are examples for possible candidates for the manufacturing of the required mine filling product of the present method for use as an in-mine stowing backfill, did at least, not rely on metallic hydroxide formation to achieve heavy metal stability at an elevated alkaline pH that had to be maintained for long-term stability in a mine characterized by fluid presence, acidity, and/or multiple migratory hazardous metal substances. As technologies are identified, envisioned, developed, and made available for the treatment of leachable heavy metals found in mine wastes and in mines, they could be suitable candidates for inclusion. Importantly, the technology identified and presented in Table 3 and FIG. 3 does meet the minimum criteria of the present invention based on the testing data presented in the example.

It is noted that treatment technology data is presented to show the requirements needed under the present innovation for manufacture of a mine filling material product for the backfill stowing within a mine that contains mine fluids, a broad-spectrum of heavy metals, and acidity. It is important to also note that each of the technologies met one criteria for the parameters analyzed, that being the general requirement of reducing metal leachability without relying upon metallic hydroxide formation. However, the long-term stability of treated materials of Tables 1 and 2 were only evaluated using Method 1320 using the EPTox and SPLP-acid rain extraction fluids, and not acid mine fluids as that testing had not been published or made known in prior art. Regardless, each of these respective technologies generated data as examples of possible candidates for use in this disclosed method to process raw material mine waste and manufacture a suitable precursor mine backfill stowing material, but further testing would be required for at least minimal acceptance confirmation as other metals require evaluation as well as their exposure to AMD or similar acidic fluids.

While treated material in Table 1 and Table 2 clearly demonstrated stability of lead to acid rain exposure derived from the respective treatment technologies, Table 2 also presents other metals of concern for the material treated based on target parameters generally associated with the BPMD NPL site, but also to only acid rain. Another third technology was evaluated that also showed promise in rendering the multitude mine waste metals non-leachable in the standard Method 1320 for acid rain. Based on reagent availability, that treated mine waste was then evaluated under the modified Method 1320 using AMD as the extraction fluid. Again, selection of this treatment technology for consideration in this present innovation was only a convenience, and not intended to eliminate the other exampled technologies, or those that are also available for evaluation and use.

Table 3 presents the data where lime-solids from the USEPA's Gold King Mine AMD water treatment system in Gladstone, CO (BPMD NPL Site) were processed and using AMD from the American Tunnel located in close proximity to the AMD lime treatment system. The American Tunnel (AT) is a bulk headed mine that has a restricted flow of AMD egressing the mine on a continuous basis. The table includes characterization data for the AT AMD used as the extraction fluid, total metals in the GKM lime solids that were treated, and the treated and untreated waste extraction heavy metal data of the various metals in each of the ten (10 sequential extractions of USEPA's Method 1320 (MEP) as modified using AMD as the extraction fluid), noting that both treated GKM lime solids and untreated lime-solids were subjected to the modified Method 1320.

Figure 3:
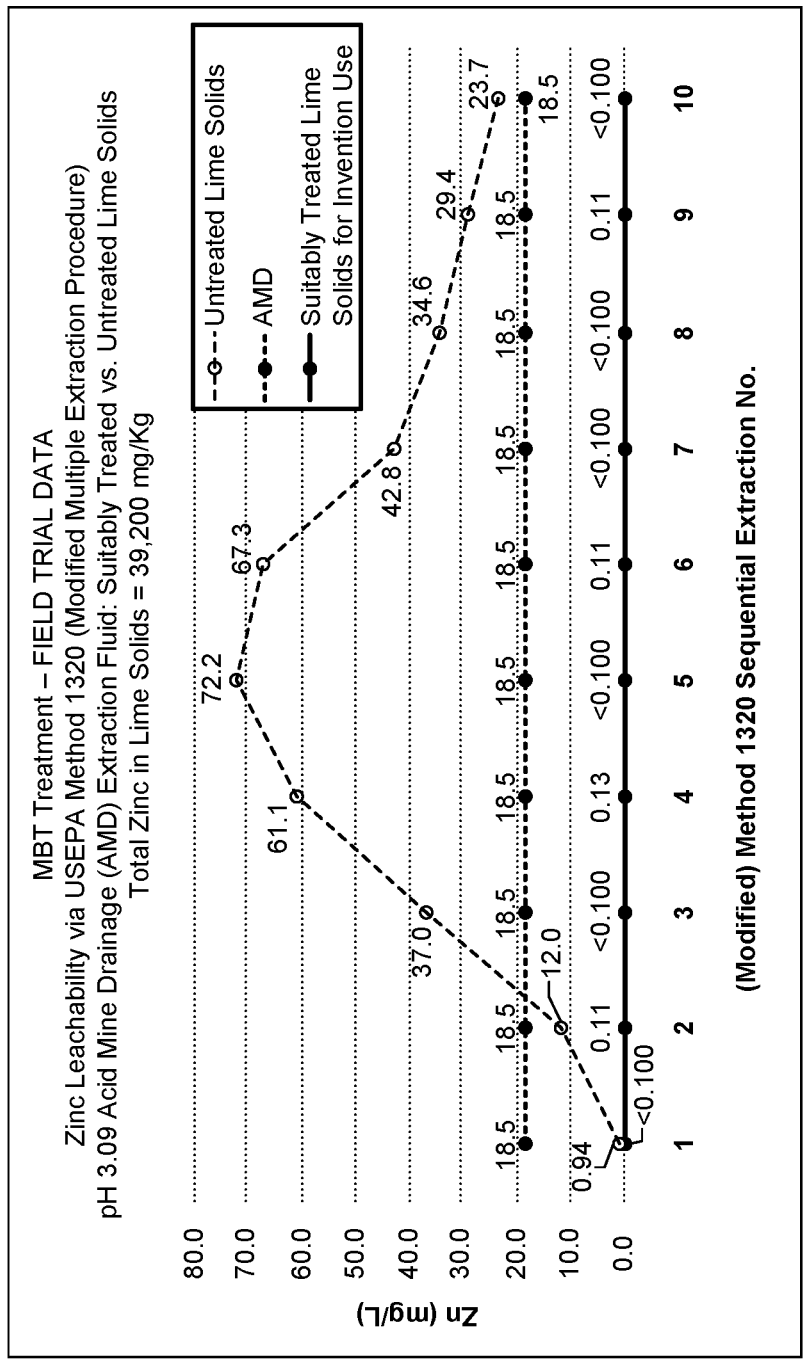
FIG. 3 is a plot illustrating data corresponding to zinc leachability, in accordance with embodiments of the present technology.

To visually illustrate the performance of the manufactured precursor product suitable for use as an in-mine stowing backfill at an abandoned, FIG. 3 graphically presents the data for zinc from Table 3. Similar leachability curves can be plotted for each parameter in Table 3 if they are respectively graphed as metal concentration vs. MEP extraction number for the AMD, the untreated lime solids, and the treated lime solids.

TABLE 1

Total and Leachable Lead for On-Site Waste Management

| Item | Total Pb (mg/Kg) | TCLP Pb (mg/L) | MEP (mg/L) |
| --- | --- | --- | --- |
| Untreated | 37,600 | 90.1 | |
| Treated | 27,300 | 0.331 | |
| MEP-1 | | | <0.132 |
| MEP-2 | | | <0.132 |
| MEP-3 | | | <0.132 |
| MEP-4 | | | <0.132 |
| MEP-5 | | | <0.132 |
| MEP-6 | | | <0.132 |
| MEP-7 | | | <0.132 |
| MEP-8 | | | <0.132 |
| MEP-9 | | | <0.132 |
| MEP-10 | | | <0.132 |

NOTES:
1) MEP-1 was performed using USEPA Method 1310 (EPTox)
2) MEP 2-10 were performed using USEPA Method 1312 (Synthetic Precipitation Leaching Procedure - Acid Rain)

The example presented in Table 1 includes data for lead, which was the only parameter of concern for the waste material at this site. As an untreated material that was a waste as defined by RCRA, the material was deemed a hazardous waste due to its toxicity for lead being in excess of 5 mg/L, the RCRA toxicity limit. No other RCRA metals were present in excess of their toxicity limit for its hazardous waste classification. After treatment, the material was non-hazardous as shown by its TCLP (EPA Method 1311) lead level. Based on Method 1320 using the method's synthetic acid rain (Method 1312) as an extraction fluid, test results on the treated material would allow the material to be managed in an onsite repository. As an example of treated material for use in the present method as a produce a suitable mine filling material product for backfill stowing within a mine, additional testing would have needed to be completed to assure lead and other RCRA and non-RCRA metals would have needed to have been evaluated, however with such a reduction of leachable lead as noted, the technology used to process this material is a likely candidate for use in the present method. It did not rely on metallic hydroxides to form insoluble metal substances at elevated pH.

TABLE 2

Heavy Metal Treatment Data
Bonita Peak Mining District NPL Site
Cement Creek Sediments Gladstone, CO:

| | | Treated Sediments-US EPA Method 1320 (Multiple Extraction Procedure) Data | | | | |
|---|---|---|---|---|---|---|
| | | 1 | 2 | 3 | 4 | 5 |
| | Total | EP-1310 | | | | |
| Metal | (mg/Kg) | (mg/L) | SPLP-1312 (mg/L) | | | |
| Aluminum | 9,130 | 0.279 | 0.216 | 0.461 | 0.164 | 0.062 |
| Arsenic | 44 | <0.100 | <0.100 | <0.100 | <0.100 | <0.100 |
| Cadmium | 8 | <0.050 | <0.050 | <0.050 | <0.050 | <0.050 |
| Copper | 274 | 0.026 | <0.050 | <0.020 | 0.021 | 0.025 |
| Iron | 72,300 | 1.86 | 0.564 | 0.771 | 0.397 | 0.337 |
| Lead | 1040 | <0.100 | <0.100 | <0.100 | <0.100 | <0.100 |
| Manganese | 738 | 4.28 | 0.788 | 0.550 | 0.406 | 0.828 |
| Zinc | 897 | 0.189 | <0.050 | <0.050 | <0.050 | 0.128 |

| | Treated Sediments-US EPA Method 1320 (Multiple Extraction Procedure) Data | | | | |
|---|---|---|---|---|---|
| | 6 | 7 | 8 | 9 | 10 |
| Metal | SPLP-1312 (mg/L) | | | | |
| Aluminum | 0.174 | 0.406 | 0.556 | 0.562 | 1.65 |
| Arsenic | <0.100 | <0.100 | <0.100 | <0.100 | <0.100 |
| Cadmium | <0.050 | <0.050 | <0.050 | <0.050 | <0.050 |
| Copper | <0.080 | 0.045 | 0.102 | 0.130 | 0.182 |
| Iron | 0.505 | 1.40 | 1.48 | 1.51 | 3.58 |
| Lead | <0.100 | <0.100 | <0.100 | <0.100 | <0.100 |
| Manganese | 0.596 | 0.661 | 0.584 | 0.397 | 0.393 |
| Zinc | 0.151 | 0.244 | 0.291 | 0.230 | 0.235 |

Table 2 presents the data for metals of concern in sediments obtained from Cement Creek in Gladstone, CO downstream from the AMD discharge from Gold King Mine in the BPMD NPL site and prior to the installation and operation of EPA's GKM AMD lime-polymer treatment system. While metals in the sediments prior to treatment were below RCRA levels for hazardous waste toxicity, the concentrations of the metals as totals (mass of metal per mass of sample) in the sediments were elevated. As in Table 1, treated material was subjected to USEPA Method 1320 using the specified extraction fluid (synthetic acid rain for the western US). Each of the metals responded favorably to treatment with the end product having very limited concentrations of leachable metals in the acid rain extraction fluid. As such, this technology is also a candidate for use in the present method, however, treated material should also be subjected to the modified Method 1320 extraction procedure where AMD is used as the extraction fluid to further confirm the technology's use to manufacture the desired precursor mine backfill stowing material to ensure it will retain its stability and remove acidity and heavy metals from the fluids within the mine. It did not rely on metallic hydroxides to form insoluble metal substances at elevated pH.

TABLE 3

Solids Treatment Technology Field Study Data
Gold King Mine (GKM) Acid Mine Drainage (AMD), Gladstone, Colorado
Bonita Peak Mining District (BPMD) NPL Site
Method 1320: Modified (American Tunnel AMD Water used as Extraction Fluid)

| | pH | Al | As | Cd | Co | Cu | Fe | Pb | Mn | Ni | Zn |
|---|---|---|---|---|---|---|---|---|---|---|---|
| Baseline | | | | | | | | | | | |
| American Tunnel AMD (mg/L-Totals) | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/Kg-Totals)>> | 8.29 | 60,100 | 70.5 | 175 | 146 | 13,100 | 246,000 | 64.1 | 22,600 | 103 | 39,200 |
| MBT Treated GKM Lime Solids (mg/L) | 3.02 | <0.250 | <0.010 | <0.0050 | <0.0050 | 0.0181 | <0.250 | 0.006 | 1.29 | 0.0231 | 13.5 |
| Extraction 1 | | | | | | | | | | | |
| American Tunnel AMD (mg/L-Totals) | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L) | | <0.250 | 0.010 | 0.257 | 0.0585 | 0.0464 | 0.653 | <0.005 | 64.3 | 0.0471 | 0.936 |
| MBT Treated GKM Lime Solids (mg/L) | | <0.250 | <0.010 | 0.005 | 0.0034 | 0.0181 | <0.250 | 0.006 | 1.29 | 0.0231 | <0.100 |
| Extraction 2 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | <0.250 | 0.011 | 0.703 | 0.264 | 0.0473 | 0.790 | <0.005 | 81.8 | 0.0988 | 12.0 |
| MBT Treated Lime Solids (mg/L) | | <0.250 | <0.010 | 0.006 | 0.0052 | 0.0271 | 0.356 | 0.011 | 2.39 | 0.0276 | 0.107 |
| Extraction 3 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | <0.250 | <0.010 | 1.30 | 0.430 | 0.0587 | 0.766 | <0.005 | 75.7 | 0.173 | 37.0 |
| MBT Treated Lime Solids (mg/L) | | <0.250 | <0.010 | 0.007 | 0.0080 | 0.0154 | <0.250 | 0.007 | 4.10 | 0.0342 | <0.100 |
| Extraction 4 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | <0.250 | <0.010 | 1.75 | 0.452 | 0.0746 | <0.250 | <0.005 | 65.4 | 0.231 | 61.1 |
| MBT Treated Lime Solids (mg/L) | | <0.250 | <0.010 | 0.009 | 0.0099 | 0.0255 | 0.434 | 0.007 | 5.47 | 0.0312 | 0.131 |
| Extraction 5 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 0.283 | 0.016 | 1.77 | 0.351 | 0.540 | 0.617 | 0.006 | 57.2 | 0.203 | 72.2 |
| MBT Treated Lime Solids (mg/L) | | <0.250 | <0.010 | 0.006 | 0.0148 | 0.0200 | 0.390 | 0.009 | 8.59 | 0.0523 | <0.100 |
| Extraction 6 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 1.45 | <0.010 | 1.70 | 0.261 | 1.7300 | 0.353 | <0.005 | 52.8 | 0.170 | 67.3 |
| MBT Treated Lime Solids (mg/L) | | <0.250 | <0.010 | 0.007 | 0.0179 | 0.0206 | 0.461 | 0.012 | 10.80 | 0.0435 | 0.106 |
| Extraction 7 | | | | | | | | | | | |
| American Tunnel AMD (mg/L-Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 7.31 | 0.017 | 1.27 | 0.214 | 3.8200 | 0.324 | <0.005 | 47.9 | 0.146 | 42.8 |
| MBT Treated Lime Solids (mg/L) | | <0.250 | <0.010 | 0.012 | 0.0227 | 0.0067 | <0.250 | <0.005 | 13.3 | 0.0443 | <0.100 |
| Extraction 8 | | | | | | | | | | | |
| American Tunnel AMD (mg/L Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 11.40 | <0.050 | 1.17 | 0.248 | 8.4200 | <0.250 | <0.005 | 61.4 | 0.167 | 34.6 |
| MBT Treated Lime Solids (mg/L) | | <0.250 | <0.010 | 0.012 | 0.0297 | 0.0120 | 0.274 | <0.005 | 17.4 | 0.0569 | <0.100 |
| Extraction 9 | | | | | | | | | | | |
| American Tunnel AMD (mg/L Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 17.0 | <0.050 | 0.51 | 0.174 | 8.85 | <0.250 | <0.005 | 47.4 | 0.143 | 29.4 |
| MBT Treated Lime Solids (mg/L) | | <0.250 | <0.010 | 0.016 | 0.0417 | 0.0163 | 0.444 | 0.006 | 24.1 | 0.0584 | 0.111 |
| Extraction 10 | | | | | | | | | | | |
| American Tunnel AMD (mg/L Totals)>> | 3.02 | 4.61 | <0.0050 | <0.0050 | 0.148 | 0.0201 | 101 | 0.0196 | 44.9 | 0.0862 | 18.5 |
| Untreated GKM EPA Lime Solids (mg/L in extract)>> | | 18.50 | <0.050 | 0.400 | 0.196 | 10.3 | 0.831 | 0.007 | 53.1 | 0.143 | 23.7 |
| MBT Treated Lime Solids (mg/L) | | <0.250 | <0.010 | 0.011 | 0.0393 | 0.0118 | 0.288 | <0.005 | 22.60 | 0.5270 | <0.100 |

Table 3 presents the data for untreated AMD fluid from the AT, the untreated EPA GKM Lime solids, and the treated EPA GKM lime solids. The data shows that the pH of the AMD is 3.02, which is at least as or more acidic than the pH conventional to TCLP, SPLP, and MEP lab-grade reagent prepared extraction fluids of their respective EPA test methods (1311, 1312, and 1320), but the AMD contained high levels of hazardous heavy metal substances that the EPA method fluids did not. The data also shows the concentration of those heavy metals in the AMD as sourced from the mine. The data also shows that both the untreated EPA lime solids and the mine waste generated from the treatment of the Gold King Mine AMD contain elevated levels of total and metals. However, and in view of the MEP extraction results using AT AMD as the extraction fluid in ten (10) sequential extractions, only the treated GKM lime solids retained its metals in the acidity of the AMD fluid and also removed metals from the AMD in each extraction. As a reminder, the same solid sample aliquot of the material being tested was moved through each of ten extractions, but with fresh extraction (AMD) fluid used at each step and with each metal respectively quantified in each extract.

This data shows that the technology used to evaluate a possible manufactured mine filling material product in Table 3 is well suited for use in this present method. This mine filling product will not only retain its heavy metals when backfilled or stowed in a mine with AMD being present, it will also address acidity, and remove heavy metals from the AMD itself. As with the other technologies, it does not rely on the formation of metallic hydroxides to reduce the leachability of heavy metals.

FIG. 3 presents the data for only zinc from Table 3 as an example of only one leachable metal often found in mine waste and mines. It is clear that the treated material retains zinc through all ten (1) extractions and removes the metals from the AT AMD. Further, lime solids from the EPA GKM water treatment system failed to withstand the rigors of the modified Method 1320 throughout the entire test where AMD was used in each of the extractions as the eluant fluid.

As such, untreated lime-solids are not adequate for use as a precursor in-mine backfill stowing material. Zinc was released when the acidity of the AMD from the mine overcame the pH buffering capacity of material, and the lime solids failed to remove heavy metals from the AMD after only the 2nd extraction. In all likelihood, a vast majority of the total 39,200 mg/Kg zinc in the untreated lime solids sample was leached from the waste by the $6^{th}$ or $7^{th}$ extraction. Looking at Table 3, other leachable metals that also caused untreated lime-solids to be unsuitable for precursor product backfill use included: aluminum, cadmium, cobalt, copper, manganese, and nickel.

As discussed, the RCRA defines whether a material is a waste or not, and if a waste, whether or not the waste is hazardous or non-hazardous. The Bevill Amendment exempts much various mine related materials from RCRA regulation, such that this exempted material is not a waste under RCRA. However, mine related materials still contain hazardous substances that can leach and contaminate and pollute water and waterways. Regardless, and despite the Bevill Amendment, the exempted mine waste material still is a source of contamination and pollution. The present invention utilizes mine related materials and mine waste (whether a RCRA waste or not) as a raw material to manufacture or beneficiate the mine related material or mine waste into a new product of economic value. The new product or precursor product is then used as a legacy mine stowing backfill material. This distinguishing characteristic of the disclosed method is in concert with RCRA and Bevill regulations where both solid waste and mine related materials are beneficiated and used to create a new resource of value, both economic and with respect to pollution mitigation of mine waste AND legacy/abandoned and operating mines.

In consideration of mine waste treatment to manufacture a suitable precursor product for use in the present innovation, the resultant leachability data of that product at minimum must pass the RCRA toxicity limit if the material is a RCRA hazardous waste. As such, it must also pass the EPA's Land Disposal Restriction upon treatment. For mine waste that is exempt from the solid waste regulations of RCRA under the Bevill Amendment, the mine waste must still not release hazardous substances as defined by CERCLA into waters and waterways where constituent concentrations may need to meet the USEPA Clean Water and Safe Drinking Water Act limits, but also those limits that may be imposed by the respective state where the mine waste and mine is located. The treatment technology to be selected for precursor product manufacture may need optimization to achieve these or other site-specific limits if required by the various jurisdictional regulatory agencies.

As long as prevailing weather continues to cause precipitation and its melt or immediate run-off and percolation into mines, AMD will be a continued source of contamination that will require prolonged and costly treatment, or AMD will carry hazardous substance constituents to downgradient waterways and supplies unless a means exists to prevent water intrusion into the mine.

By using a treatment technology that performs as shown, a precursor in-mine stowing backfill product can be manufactured for its use as part of the present method to ultimately fill and close a mine such that the mine waste and the mine are prevented from releasing hazardous heavy metal substances and acidity separately identified in both the mine waste(s) and mines with this present method. Thus, the hazards and pollutants emanating from historic mining district sites where offending mine waste and mines are located can both be safely and permanently resolved with a single beneficial solution to better human health and the environment.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A mine closure method comprising:
processing mine waste to produce a mine filling product (MFP) with at least one hazardous component or aspect of the original waste material altered; and
backfilling a mine or a portion thereof with the MFP;
wherein processing the mine waste to produce the MFP with at least one hazardous component or aspect of the original mine waste altered comprises processing the mine waste in a manner that reduces the leachability of heavy metals or other hazardous substances contained within the mine waste and which are contained in the MFP after the MFP is produced, and
wherein the MFP produced by processing the mine waste is configured to remove heavy metals contained in fluids that contact the MFP.

2. The mine closure method of claim 1, wherein processing the mine waste in a manner that reduces the leachability of heavy metals or other hazardous substances contained in the mine waste comprises a process that produces MFP that will not release and leach heavy metals or other hazardous substances when exposed to acid rain, acidic fluids, mine fluids, mine drainage or other acidic matter.

3. The mine closure method of claim 1, wherein processing the mine waste to produce the MFP with at least one hazardous component or aspect of the original mine waste altered further comprises processing the mine waste in a manner that changes the sulfide concentration level of the mine waste by chemical altering at least a portion of the sulfide in the mine waste.

4. The mine closure method of claim 1, wherein the fluid is acid mine drainage or acid rock drainage.

5. The mine closure method of claim 1, wherein the mine waste is material that was generated by operations in the mine to be backfilled.

6. The mine closure method of claim 1, wherein the MFP produced by processing the mine waste is suitable to be used to backfill a mine or is stowed in a mine.

7. The mine closure method of claim 1, wherein processing the mine waste further comprises conditioning the mine waste by screening, crushing and/or washing the mine waste.

8. The mine closure method of claim 7, wherein the conditioning of the mine waste does not include chemically treating the mine waste.

9. The mine closure method of claim 7, wherein the conditioning of the mine waste includes separating oversized material from the mine waste.

10. The mine closure method of claim 9, wherein the conditioning of the mine waste includes treating the separated oversized material to create an oversize mine filling product.

11. The mine closure method of claim 10 further comprising adding treated oversized mine filling material to the backfill material.

12. The mine closure method of claim 1, wherein processing the mine waste further comprises processing the mine waste in a manner that adds material strength, toughness, and/or stability to the MFP.

13. The mine closure method of claim 1, further comprising removing water from the mine prior to and/or during backfill.

14. The mine closure method of claim 1, further comprising applying pressure, hydraulic gradient, vibration and/or loading sequencing to the MFP during backfilling such that fines in the MFP can move into cracks, fissures, and fractures of a mine.

15. A method for processing mine waste, comprising:
processing mine waste to produce a mine filling product (MFP) comprising at least one of a hazardous component or altered mine waste material, the MFP being configured to remove heavy metals in fluids that contact the MFP; and
backfilling at least a portion of a mine with the MFP;
wherein processing the mine waste to produce the MFP comprises processing the mine waste in a manner that reduces the leachability of hazardous substances of the MFP, and
wherein the MFP produced by processing the mine waste is configured to remove heavy metals contained in fluids that contact the MFP.

16. The method of claim 15, wherein processing the mine waste comprises processing the mine waste such that the sulfide concentration level of the mine waste is altered.

17. The method of claim 15, wherein processing the mine waste comprises processing the mine waste by chemically altering at least a portion of the sulfide in the mine waste.

* * * * *